United States Patent Office 3,294,828
Patented Dec. 27, 1966

3,294,828
AROMATIC NITRIC OXIDE VANADIUM TETRACARBONYLS
Robert P. M. Werner, Binningen, Basel-Land, Switzerland, assignor to Ethyl Corporation, New York, N.Y., a corporation of Virginia
No Drawing. Filed June 17, 1963, Ser. No. 288,462
3 Claims. (Cl. 260—429)

This application is a continuation-in-part of application Serial No. 101,652, filed April 10, 1961, now abandoned, which in turn is a continuation-in-part of application Serial No. 83,870, filed January 23, 1961, now abandoned.

This invention relates to novel organometallic compounds and to a process for their formation. More specifically, this invention relates to organometallic compounds of vanadium. Furthermore, this invention relates to new tetracarbonyl compounds of vanadium having a nitrosyl group and also containing a V—M bond wherein M is a Group VA element of atomic number of at least 15.

An object of this invention is to provide organometallic compounds of vanadium. Another object of this invention is to provide tetracarbonyl compounds of vanadium which contain a phosphine, arsine, stibine or bismuthine radical in which the phosphorus, arsenic, bismuth or antimony atom is bonded to vanadium. Another object is to provide the compounds of vanadium which contain a nitrosyl group. Still another object of this invention is to provide a process for the formation of these compounds. Another object is to provide a process for depositing a vanadium-containing plate on a variety of substrates.

The objects of this invention are accomplished by providing new vanadium compounds having the formula:

$$(R^1R^2R^3M)V(NO)(CO)_4 \quad (I)$$

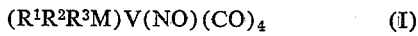

wherein $R^1$, $R^2$ and $R^3$ are aromatic benzenoid hydrocarbon radicals having 6 to about 13 carbon atoms and M is a Group VA element having an atomic number of at least 15. The applicable Group VA elements are phosphorus, arsenic, antimony and bismuth.

These compounds are preferred. However, compounds having the formulae:

$$(R^1H_2M)V(NO)(CO)_4 \quad (II)$$

$$(R^1R^2HM)V(NO)(CO)_4 \quad (III)$$

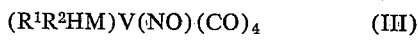

wherein $R^1$ and $R^2$ and M are the same as above, are also part of this invention. The novel compounds of this invention are prepared by a process comprising the reaction of a nitrosylating agent with a phosphine, arsine, stibine or bismuthine vanadium tetracarbonyl reactant containing at least one organic radical within each of the phosphine, arsine, stibine or bismuthine radicals. In this process, one molar equivalent of nitric oxide displaces one molar equivalent of phosphine, arsine, stibine or bismuthine in the starting material. The reactants are paramagnetic and the novel products are diamagnetic.

The (phosphine, arsine, stibine or bismuthine) vanadium tetracarbonyl compounds used in the process of this invention are described in my co-pending application, Serial No. 190,198, filed April 23, 1962, now U.S. Patent No. 3,247,233, issued April 19, 1966. The disclosure of that application is incorporated herein as if fully set forth.

The novel compounds of this invention consist of four components, viz., a phosphine, arsine, stibine or bismuthine group, a vanadium atom, a nitrosyl radical and four carbonyl groups. Since all of the compounds contain the latter three substances in the same molar proportions, the variance in properties among the individual members of this new class of compounds is largely bestowed by the phosphine, arsine, stibine or bismuthine group.

The nitrosyl vanadium tetracarbonyl compounds of this invention having a phosphine, arsine, stibine or bisuthine radical containing at least one aryl radical bonded to the phosphorus, arsenic, antimony or bismuth atom are preferred since the starting materials from which they are obtained are more readily available than the corresponding aliphatic derivatives. The (phosphine, arsine, stibine and bismuthine) vanadium tetracarbonyl reactants containing secondary and tertiary aryl phosphines, arsines, stibines and bismuthine groups are more readily available than reactants having primary groups. Hence, secondary and tertiary aryl phosphine, arsine, stibine and bismuthine vanadium nitrosyl tetracarbonyls prepared from them are more preferred. The most preferred compounds of this invention are the tertiary aryl phosphine, arsine, stibine and bismuthine vanadium nitrosyl tetracarbonyl compounds.

The aryl groups in the phosphine, arsine, stibine and bismuthine radicals are either the phenyl radical or a substituted derivative thereof. Examples include the primary, secondary and tertiary phosphine radicals, phenylphosphine, diphenylphosphine and triphenylphosphine.

The phenyl radicals may be substituted by one or more monovalent hydrocarbon radicals. For example, phosphine, arsine, stibine and bismuthine radicals containing the tolyl, 2,3-xylyl, mesityl, durenyl, and pentamethylphenyl radicals are applicable. Examples are the tri(2,3-xylyl)phosphine, trimesitylbismuthine, and tridurenyl stibine radicals. Reaction of compounds having these radicals such as bis[tri(2,3-xylyl)phosphine]vanadium tetracarbonyl, bis(trimesityl bismuthine)vanadium tetracarbonyl, and bis(tridurenyl stibine)vanadium tetracarbonyl, with a nitrosylating agent, yield tri(2,3-xylyl)phosphine vanadium nitrosyl tetracarbonyl, tri(mesityl bismuthine)vanadium nitrosyl tetracarbonyl, and tri(durenyl)stibine vanadium nitrosyl tetracarbonyl respectively.

Similarly, the compounds of this invention can have aryl phosphine, arsine, stibine and bismuthine radicals having higher aliphatic radicals substituted on the phenyl ring. Examples of this type of compound are tri(ethylphenyl)phosphine vanadium nitrosyl tetracarbonyl, di(butylphenyl) arsine vanadium nitrosyl tetracarbonyl, tri(1,3,5-triethylphenyl)stibine vanadium nitrosyl tetracarbonyl, tri(4-heptylphenyl)phosphine vanadium nitrosyl tetracarbonyl and the like.

The aromatic radicals may also be substituted by radicals such as the benzyl and cyclohexylethyl radicals.

The phenyl ring may also be substituted by one or more divalent radicals. Hence, phosphine, arsine, stibine and bismuthine groups containing aryl radicals derived from naphthalene, tetralin, phenanthrene and the like are applicable. The trinaphthyl phosphine radical depicted below illustrates this type of radical.

(IV)

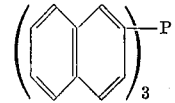

The rings in such radicals may be substituted with various monovalent organic radicals similar to those described above or below.

It has been found that there is no exact limitation on the size or complexity of the aryl radicals bonded to the Group VA element within the novel compounds of my invention. However, since the bis(phosphine, arsine, stibine and bismuthine)vanadium tetracarbonyls used as reactants which have lower aryl radicals of 6 to about 13 carbon atoms are more readily available, compounds of this invention having aryl rings containing that number of carbon atoms are preferred.

When two or three aryl radicals are bonded to the phosphorous, arsenic, antimony or bismuth atom of the compounds of this invention, the radicals may be alike or different. Hence, such compounds as di(2-methylphenyl)phosphine vanadium nitrosyl tetracarbonyl and tri(2-methylphenyl)phosphine vanadium nitrosyl tetracarbonyl are examples of compounds of this invention derived from reactants having identical radicals attached to the Group VA atom. The compounds

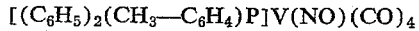

and

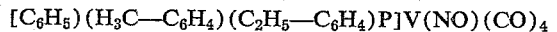

are examples of compounds of this invention having dissimilar aryl radicals bonded to the Group VA element. Because phosphine, arsine, stibine and bismuthine vanadium tetracarbonyls containing two or three identical radicals bonded to the same phosphorus, arsenic, antimony or bismuth atom are more readily available starting materials, the compounds of this invention derived from them are preferred.

The preferred compounds of this invention have the generic formula $(RR^1R^2M)V(NO)(CO)_4$ wherein R, $R^1$ and $R^2$ are aromatic benzenoid hydrocarbon radicals having 6 to about 13 carbon atoms. The most preferred compounds are those wherein R, $R^1$ and $R^2$ are identical aromatic benzenoid hydrocarbon radicals.

A highly preferred class of aryl radicals bonded to the phosphorus, arsenic, antimony or bismuth atom within the novel compounds of this invention are hydrocarbon radicals. That is, they are completely composed of carbon and hydrogen. However, the aryl radical bonded to the Group VA element may also contain other groups such as amino, secondary amino, tert-amino, nitro, hydroxy, alkoxy, carboxy, keto, sulfonyl and the like.

The novel compounds of this invention can be considered as carbonyl vanadium nitrosyl derivatives of phosphines, arsines, stibines and bismuthines. There is a decided shift in metallic characteristics in the applicable Group VA elements. Phosphorus is almost a true nonmetal and bismuth is almost a true metal. Thus, as the series triarylphosphine vanadium nitrosyl tetracarbonyl, triarylarsine vanadium nitrosyl tetracarbonyl, triarylstibine vanadium nitrosyl tetracarbonyl, and triarylbismuthine vanadium nitrosyl tetracarbonyl is descended, there is a marked transformation from compounds containing vanadium bonded to only non-metallic elements to a bimetallic compound wherein the metals are vanadium and bismuth.

The preferability of the Group VA elements within the compounds of this invention is dependent upon whether compounds containing only one metal or two metals are desired. Thus, the bismuthine vanadium compounds of this invention are of special interest since their decomposition can afford a method of plating an alloy of bismuth and vanadium. The phosphine, arsine, and stibine derivatives are preferred because of the availability of the starting materials. Phosphine materials being the most readily available, the compounds of this invention containing a phosphine radical are the most preferred compounds.

The vanadium carbonyl reactants employed in the process of this invention have the formula

wherein $R^1$ to $R^6$ are aryl radicals having 6 to about 13 carbon atoms, $x$ and $y$ are equal to zero or one, and $z$ is equal to $2(x+y)$. $M_1$ and $M_2$ are either alike or different and are selected from the class consisting of phosphorus, arsenic, antimony and bismuth. Compounds wherein $M_1$ and $M_2$ are dissimilar are not preferred since these compounds are not readily available and a mixture of the products of this invention is prepared when they are employed in the process. Preferred reactants are bis compounds having the formula

wherein $R^1$ to $R^3$ and $x$, $y$ and $z$ have the same significance as above. Particularly preferred reactants of this type have the formula

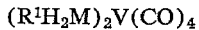

and

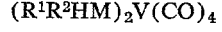

Highly preferred reactants have the formula

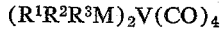

Particularly preferred reactants have the formula

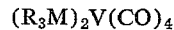

The compounds of this invention are prepared by reacting a phosphine, arsine, stibine or bismuthine vanadium tetracarbonyl compound with a nitrosylating agent such as nitric oxide or nitrous acid. The most preferred nitrocylating agent is nitric oxide. The compounds can also be prepared by reacting the sodium salt of the bis(phosphine, arsine, stibine or bismuthine) vanadium tetracarbonyl compound with an organic nitrosylating agent such as N-methyl, N-nitrosyl-p-toluene sulfonamide. The sodium salt used in this reaction can be prepared by any technique known to those skilled in the art. For example, reactions of the neutral compounds with a sodium amalgam or sodium dispersion are suitable techniques. Similar salts such as the potassium and calcium salts are also satisfactory.

The nitrosylation of the phosphine, arsine, stibine or bismuthine vanadium tetracarbonyl compound need not be carried out in a homogeneous system. It is only necessary that the reactants be sufficiently contacted. For example, a reaction between gaseous nitric oxide and solid triphenylphosphine vanadium tetracarbonyl dispersed in n-hexane is an efficacious procedure for the preparation of triphenylphosphine vanadium nitrosyl tetracarbonyl. This procedure is more specifically reported in Example I. A suitable dispersion employed in this type of reaction is a non-reactive organic solvent. Any solvent which will suitably disperse the phosphine, arsine, stibine or bismuthine vanadium tetracarbonyl compound, and which is non-reactive toward that compound and the the nitrosylating agent, can be employed. Typical solvents used as a dispersing media in the process of this invention are the hydrocarbon solvents illustrated by n-hexane, heptane, n-pentane, isooctane, nonane, petroleum ether, gasoline kerosene, and the like. Other solvents such as methanol, benzene, acetone and other ketones and other aromatic hydrocarbons can be employed. Chlorinated solvents such as difluoromethane, chloroform, carbon tetrachloride, dichloroethylene, trifluoroethylene and the like can also be employed in many instances. However, many of the bis(phosphine, arsine, stibine or bismuthine)vanadium tetracarbonyl reactants are instantaneously decomposed with carbon tetrachloride. In these instances, some solvent other than carbon tetrachloride should be employed.

The reaction proceeds well under atmospheric pressure. However, higher and lower pressures can be employed if desired. Mild temperatures in the range of about $-20$ to about $60°$ C. are the temperatures of choice. The preferred temperature range is 10 to $40°$ C. Usually the reaction is complete within 36 hours. However, the time is not a true independent variable and is dependent upon the other reaction conditions employed and the particular reactivity of the reactants. Higher temperatures usually decrease the reaction time.

The preferred conditions of time, temperature, pressure and solvent or dispersing agent, are those conditions which are compatible with the reactants and with the products.

The use of a protective atmosphere is preferred. In many instances extreme care must be taken that the material, until isolated and purified, is always maintained under a protective atmosphere. Various inert gases such as nitrogen, helium, argon, neon and the like can be employed. However, nitrogen is the preferred gas since it is inexpensive and readily available.

Generally, the compounds of this invention are solids. They can be separated from the reaction mixture and subsequently purified by methods apparent to those skilled in the art. Separation and purification procedures such as filtration, evaporation of the solvent followed by recrystallization, sublimation or chromatography and the like, are examples of suitable techniques.

The following examples are presented to further illustrate the novel compounds of this invention and the process for their formation. All parts are parts by weight unless otherwise designated.

EXAMPLE I

About one gram of crude bis(triphenylphosphine) vanadium tetracarbonyl was mixed with filter aid and washed thoroughly with methanol and petroleum ether to remove any free triphenylphosphine. After suspending the washed solids in about 100 ml. of petroleum ether, nitric oxide from a cylinder was bubbled through the suspension from a fritted plate in the bottom of the reaction flask. After about one minute, the originally colorless supernatant liquid had assumed an orange-yellow color. The nitric oxide feed was then discontinued and the solution was filtered through the fritted plate. On standing for one hour, large crystals separated from the clear orange-yellow solution. The crystals were filtered, dried, and analyzed.

The crystalline solid was stable in air for several hours before it darkened and decomposed. It was also slightly sensitive to light when stored under nitrogen as evidenced from a superficial change of color. The compound was soluble in most organic solvents without decomposition as long as it was kept under a nitrogen blanket. An extensive study of the infrared spectrum of the compound plus an elemental analysis showed the compound to be triphenylphosphine nitric oxide vanadium tetracarbonyl.

The compound was fairly stable in air, melted at 88–90° C. (dec., sealed capillary under nitrogen) and was soluble in carbon tetrachloride which reacts instantaneously with the paramagnetic starting material.

EXAMPLE II

Using a procedure similar to Example I, nitric oxide is reacted at room temperature with bis(trinaphthylphosphine)vanadium tetracarbonyl suspended in n-heptane. The compound trinaphthylphosphine vanadium nitrosyl tetracarbonyl is obtained. The analogous arsine, stibine and bismuthine derivatives are prepared by a similar procedure.

EXAMPLE III

Using a procedure similar to Example I, nitric oxide is reacted at −20° C. with bis[di(biphenylyl)phosphine]vanadium tetracarbonyl, suspended in petroleum ether. The product formed is di(biphenylyl)phosphine vanadium nitrosyl tetracarbonyl. The analogous arsine, stibine and bismuthine derivatives are prepared by a similar procedure.

EXAMPLE IV

Using a procedure similar to Example I, nitric oxide is reacted with bis[tri(2,4-dipropyl)phenylphosphine]vanadium tetracarbonyl suspended in n-pentane. The reaction is carried out at −10° C. The product tri(2-4-dipropyl)phenylphosphine vanadium nitrosyl tetracarbonyl is obtained. The analogous arsine, stibine, and bismuthine derivatives are prepared by a similar procedure.

EXAMPLE V

Using a procedure similar to Examples I and II, nitric oxide is reacted with the compound bis[tri(3-heptylphenyl)phosphine]vanadium tetracarbonyl suspended in nonane. The reaction is carried out at 60° C. The compound tri(3-heptylphenyl)phosphine vanadium nitrosyl tetracarbonyl is obtained. The analogous arsine, stibine and bismuthine derivatives are prepared by a similar procedure.

EXAMPLE VI

Using a procedure similar to Example I, the compound bis[phenyl(tolyl)phosphine]vanadium tetracarbonyl is reacted at room temperature with nitric oxide using chloroform as the dispersion medium. The compound [phenyl(tolyl)phosphine]vanadium nitrosyl tetracarbonyl is obtained. The analogous arsine, stibine and bismuthine derivatives are prepared by a similar procedure.

EXAMPLE VII

Using a procedure similar to Example I, nitric oxide is reacted at 50° C. with bis[phenyl(2-tolyl)(2,3-xylyl)phosphine]vanadium tetracarbonyl suspended in methanol. The reaction is carried out at room temperature. The product [phenyl(2-tolyl)(2,3-xylyl)phosphine]vanadium nitrosyl tetracarbonyl is obtained. The analogous arsine, stibine and bismuthine derivatives are prepared by a similar procedure.

EXAMPLE VIII

*Vapor phase plating of a steel with (triphenylphosphine) vanadium nitrosyl tetracarbonyl*

A suitable quantity of triphenylphosphine vanadium nitrosyl tetracarbonyl is placed into a reservoir equipped with heating means. The reservoir is connected through a valve to a plating chamber wherein the object to be plated, a steel plate, is supported. The steel plate is connected to a temperature measuring device. The plating chamber is equipped with an induction coil which surrounds the metal object to be plated. The plating chamber is connected to a cold trap downstream from the reservoir and the cold trap is connected to a vacuum pump. The system is evacuated to a pressure less than 0.2 mm. of mercury. The reservoir is sufficiently heated to volatilize the triphenylphosphine vanadium nitrosyl tetracarbonyl and to provide a steady continuous evolution of that compound. The temperature of the steel plate is raised to 400–550° C.

Upon contact of the vapor with the hot steel plate, a metallic vanadium-containing deposit is deposited on the plate. The organic vapors resulting from the decomposition of the plating compound together with the unsued plating compound are collected in the cold trap. The unused material is recovered by suitable extraction and crystallization and used in another run.

Any material which can withstand a temperature of 400° C. can be plated with a vanadium-containing deposit using this technique. Iron, copper, bronze, brass, chromium, and various porcelains and other ceramics can be coated.

An object of this invention is to provide an improved method for plating vanadium on a variety of substrates. A further object is to provide a more efficient and effective method for plating vanadium in an economical manner.

The above and other objects are accomplished by a process for plating vanadium upon a substrate which comprises thermally decomposing a vapor consisting essentially of arylphosphine, arsine, stibine and bismuthine vanadium nitrosyl tetracarbonyls in contact with said substrate wherein said process is conducted at a temperature of from about 200° C. to about 600° C., and at a pressure of from about 0.01 mm. to about 10 mm. of mercury. The objects set out hereinabove are further accomplished by a process for plating vanadium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

The temperature conditions coupled with pressure in the plating chamber forms the critical feature of the present process. Thus, where the temperature ranges from about 200° C. to about 600° C. preferably 500° C. to 550° C., and the pressure in the chamber ranges from about 0.01 to about 10 mm. of mercury, better plates are obtained having better adherence to the substrate and pinhole-free surfaces.

In the process of this invention a carrier gas is not required or desirable. Generally carrier gases tend to react with the vanadium being plated to form carbides, nitrides or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the novel vanadium tetracarbonyl compound at temperatures from about 150° C. to about 200° C. The temperature used depends on the flow rate desired.

The flow rate of the vanadium vapor is dependent to a certain extent upon the amount of pressure in the plating chamber and the temperature to which the compound is subjected. Ordinarily, the flow rates of the plating compound employed vary from about one foot per minute to about 30 feet per second although faster or slower rates can be employed.

The time required to plate vanadium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the vanadium coating.

Adherent vanadium metal coatings can be obtained through depositing its vapor directly upon any substrate which can withstand the plating conditions. Typical examples of substrates that may be plated are nickel, Pyrex glass, beryllium, molybdenum, graphite, ceramics, high temperature resistant plastics and the like. The preferred substrates that can be plated are ferrous metal substrates, aluminum and the like.

In some cases, the substrates to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sandblasting. The vapor plated coatings have even better adherence on slightly uneven surfaces, such as created by sandblasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already non-uniform, if desired, degreasing can be performed to assure a clean plating surface. Other substrate pre-treatments known to the art can be employed, if desired, and will now be evident for the above and other substrates.

The types of apparatus which may be used for the plating operation are any of the apparatus described in the prior art, such as set forth by Lander and Germer in "Plating Molybdenum, Tungsten and Chromium by Thermal Deposition of Their Carbonyls," or by Powell, Campbell and Gonser in the book "Vapor Plating," John Wiley & Sons, New York, 1955, wherein a vacuum chamber is used.

Heating may be achieved by numerous methods. Generally, resistance heating, infrared heating or induction heating are used according to the nature of the substrate and the type of equipment employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of the vanadium compound by ultrasonic frequency or by ultraviolet irradiation. The former process involves essentially the same procedure as employed in Example VIII with the exception that an ultrasonic generator is proximately positioned to the plating apparatus. The vanadium compound is then heated to its decomposition threshold and thereafter the ultrasonic generator is utilized to effect final decomposition. Decomposition by ultraviolet irradation involves essentially the same method as utilized in Example VIII with the exception that in place of the resistance furnace there is utilized for heating a battery of ultraviolet and infrared lamps placed circumferentially around the outside of the heating chamber. The substrate to be heated is brought to a temperature just below the decomposition temperature of the vanadium plating agent with the infrared heating and thereafter decomposition is effected with ultraviolet rays.

Although the above techniques generally employ the vanadium plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of triphenylphosphine vanadium nitrosyl tetracarbonyl. The tube is heated at 400° C. for one hour after which time the tube is cooled and opened. The cloth has a uniform metallic grey appearance and exhibits a gain in weight. The cloth has greatly decreased resistivity. An application of current to the cloth causes an increase in its temperature. Thus, a conducting cloth is prepared. This cloth can be used to reduce static electricity, for decoration, for thermal insulation by reflection, and as a heating element.

The novel compounds of this invention are particularly useful as chemical intermediates, fuel and lubricating oil additives, polymerization catalysts, combustion control additives, fungicides, herbicides, pesticides and bactericides.

Having fully described the novel compounds of this invention, their mode of preparation and their utility, I desire to be limited only within the lawful scope of the appended claims.

I claim:
1. A compound having the formula

$$(R^1R^2R^3M)V(NO)(CO)_4$$

wherein $R^1$, $R^2$ and $R^3$ are aromatic benzenoid hydrocarbon radicals having 6 to about 13 carbon atoms and M is a Group VA element having an atomic number of at least 15.

2. The compound of claim 1 wherein $R^1$, $R^2$ and $R^3$ are identical.

3. Triphenylphosphine nitric oxide vanadium tetracarbonyl.

References Cited by the Examiner

UNITED STATES PATENTS

| | | | |
|---|---|---|---|
| 2,818,416 | 12/1957 | Brown et al. | 260—429 |
| 2,827,446 | 3/1958 | Breslow | 260—429 |
| 2,960,514 | 11/1960 | Brown et al. | 260—429 |
| 2,971,017 | 2/1961 | Fischer et al. | 260—429 |
| 3,013,039 | 12/1961 | Lambert et al. | 260—429 |
| 3,108,014 | 10/1963 | Gellar | 117—107.2 |
| 3,152,007 | 10/1964 | Perrin | 117—107.2 |

TOBIAS E. LEVOW, *Primary Examiner.*

HELEN McCARTHY, *Examiner.*

T. L. IAPALUCCI, A. P. DEMERS,
*Assistant Examiners.*